United States Patent
Soga et al.

(10) Patent No.: US 6,652,672 B1
(45) Date of Patent: Nov. 25, 2003

(54) MATERIAL FOR BEARING PARTS

(75) Inventors: Satoshi Soga, Nara (JP); Masao Goto, Habikino (JP)

(73) Assignee: Koyo Seiko Co., Ltd., Osaka (JP)

(*) Notice: Subject to any disclaimer, the term of this patent is extended or adjusted under 35 U.S.C. 154(b) by 0 days.

(21) Appl. No.: 09/806,768
(22) PCT Filed: Aug. 23, 2000
(86) PCT No.: PCT/JP00/05669
§ 371 (c)(1), (2), (4) Date: Apr. 3, 2001
(87) PCT Pub. No.: WO01/16390
PCT Pub. Date: Mar. 8, 2001

(30) Foreign Application Priority Data

Aug. 27, 1999 (JP) .............................. 11-241578

(51) Int. Cl.[7] .............................. C22C 38/18
(52) U.S. Cl. .............................. 148/328
(58) Field of Search .............................. 148/328

(56) References Cited

FOREIGN PATENT DOCUMENTS

| | | |
|---|---|---|
| GB | 2 321 254 | 7/1998 |
| GB | 2 328 479 | 2/1999 |
| JP | 9-256105 | 9/1997 |
| JP | 10-259451 | 9/1998 |
| JP | 11-61338 | 3/1999 |
| JP | 11-80896 | 3/1999 |
| JP | 11-80897 | 3/1999 |

*Primary Examiner*—Roy King
*Assistant Examiner*—Harry D. Wilkins, III
(74) *Attorney, Agent, or Firm*—Smith, Gambrell & Russell, LLP

(57) ABSTRACT

In a material for bearing parts constructed from a steel hardened by a heat treatment, its surface layer is adjusted, before a shot peening treatment, for a mean particle size of carbide to less than 1 $\mu$m, an area percentage of carbide to 10–15%, an amount of residual austenite to 7–14% and a hardness thereof to HRC=61–65; and subsequently, the shot peening treatment is conducted. Thus is produced a material for bearing parts which can satisfy the life requirements for bearings without an excessive increase in a shot time during the shot peening treatment.

3 Claims, 1 Drawing Sheet

MATERIAL FOR BEARING PARTS

TECHNICAL FIELD

The present invention relates to a bearing part material for forming bearing parts such as a race of a rolling bearing assembly.

BACKGROUND ART

The life of a rolling bearing assembly is highly dependent upon wear on a raceway surface or occurrence of surface flaking such as called pitting. Accordingly, a bearing part constituting a bearing of the rolling bearing assembly or the like employs a material such as bearing steel of high carbon content or carburizing steel capable of being formed with a carburized layer at its surface area through a carburizing treatment. Further, the material for bearing parts is subjected to a heat treatment such as a hardening/tempering treatment for transforming at least its surface layer constituting the raceway surface to a martensitic structure, and thereby a required hardness for preventing wear as well as a required toughness for preventing pitting are ensured.

More recently, however, bearing assemblies for use in automobiles have become unable to satisfy the life requirements because conditions under which they operate have become more severe. This has brought about a demand for a material for bearing parts which is capable of satisfying the life requirements for such bearing assemblies. Hence, it has become the practice in the art to apply a shot peening treatment to the heat treated material for bearing parts thereby imparting compressive residual stress to the raceway surface for the purpose of improving the life of the bearing assemblies.

Unfortunately, even when the shot peening treatment is applied, the bearing assemblies may sometimes encounter variations in the life. As an approach to ensure that the life requirements are satisfied, a shot time during the shot peening treatment is increased. However, this approach involves a problem that the bearing assemblies are produced at lower efficiency and hence, at higher costs.

In view of the foregoing problem of the prior art, the present invention has an object to provide a material for bearing parts which is capable of satisfying the life requirements for bearing assemblies without an excessive increase in the shot time during the shot peening treatment.

DISCLOSURE OF THE INVENTION

In accordance with the present invention for achieving the above object, a material for bearing parts comprises a steel hardened by a heat treatment and having a tempered martensitic structure at its surface layer to be subjected to a shot peening treatment, wherein the tempered martensitic structure contains carbide with a mean particle size of less than 1 $\mu$m and an area percentage of 10–15%, and residual austenite in an amount of 7–14%, and has a hardness of HRC=61–65.

In the material for bearing parts of the above composition, plastic deformation can be produced as extended from the surface toward deep inside without increasing the shot time during the shot peening treatment. This permits the residual stress to be effectively imparted to the material for bearing parts, so that the material may form bearings intended for use under severe conditions which feature an increased longevity and smaller life variations, and thereby the material can satisfy the life requirements. In addition, it is possible to offer the bearing part material for producing bearings at high efficiency and low costs because the material negates the need for excessively increasing the shot time during the shot peening treatment.

Specifically, the present inventors have found that the varied life of bearings constructed from the conventional bearing part material derives from the variations in quality of the material which has been heat treated and is yet to be subjected to the shot peening treatment. The present inventors also found that the heat treated bearing part material may be properly adjusted for the mean particle size and area percentage of carbide contained therein, for the amount of residual austenite contained therein and for the hardness thereof and then be subjected to the shot peening treatment for imparting thereto the plastic deformation extended from the surface toward deep inside whereby the utilization of the effect of the compressive residual stress is maximized for achieving the life improvement. Based on such findings, the present invention has been accomplished.

The reason for defining the mean particle size of carbide as less than 1 $\mu$m is because the presence of carbide 1 $\mu$m or more in size limits the compressive residual stress imparted by the shot peening treatment within a portion of a shallow depth from the surface.

The reason for defining the area percentage of carbide as 10–15% is because with the area percentage thereof in excess of 15%, the compressive residual stress imparted by the shot peening treatment is limited within the portion of the shallow depth from the surface whereas with the area percentage of less than 10%, rolling contact fatigue life is reduced.

The reason for defining the amount of residual austenite as 7–14% is because if the residual austenite is present in an amount of less than 7%, the transformation of the residual austenite cannot provide sufficient compressive residual stress; on the other hand, if the residual austenite is present in an amount of more than 14%, residual austenite in a surface layer is referentially transformed to martensite, inhibiting the transformation of residual austenite in an inside portion, so that the compressive residual stress cannot be imparted so far as to the inside.

The reason for defining the hardness as HRC=61–65 is because with the hardness in excess of 65, the shot peening treatment produces insufficient plastic deformation, thus failing to impart the compressive residual stress so far as to the inside; with the hardness of less than 61, on the other hand, the shot peening treatment produces too much elastic deformation which means reduction of the plastic deformation and hence, the compressive residual stress cannot be imparted so far as to the inside just as the foregoing.

As a steel employed as the above bearing part material, a bearing steel is preferred.

In this case, the material may be imparted with the compressive residual stress to an extent of an even greater depth from surface, resulting in more effective life improvement. Thus is attained a more preferable material for bearing parts.

BEST MODES FOR CARRYING OUT THE INVENTION

Figure 1:
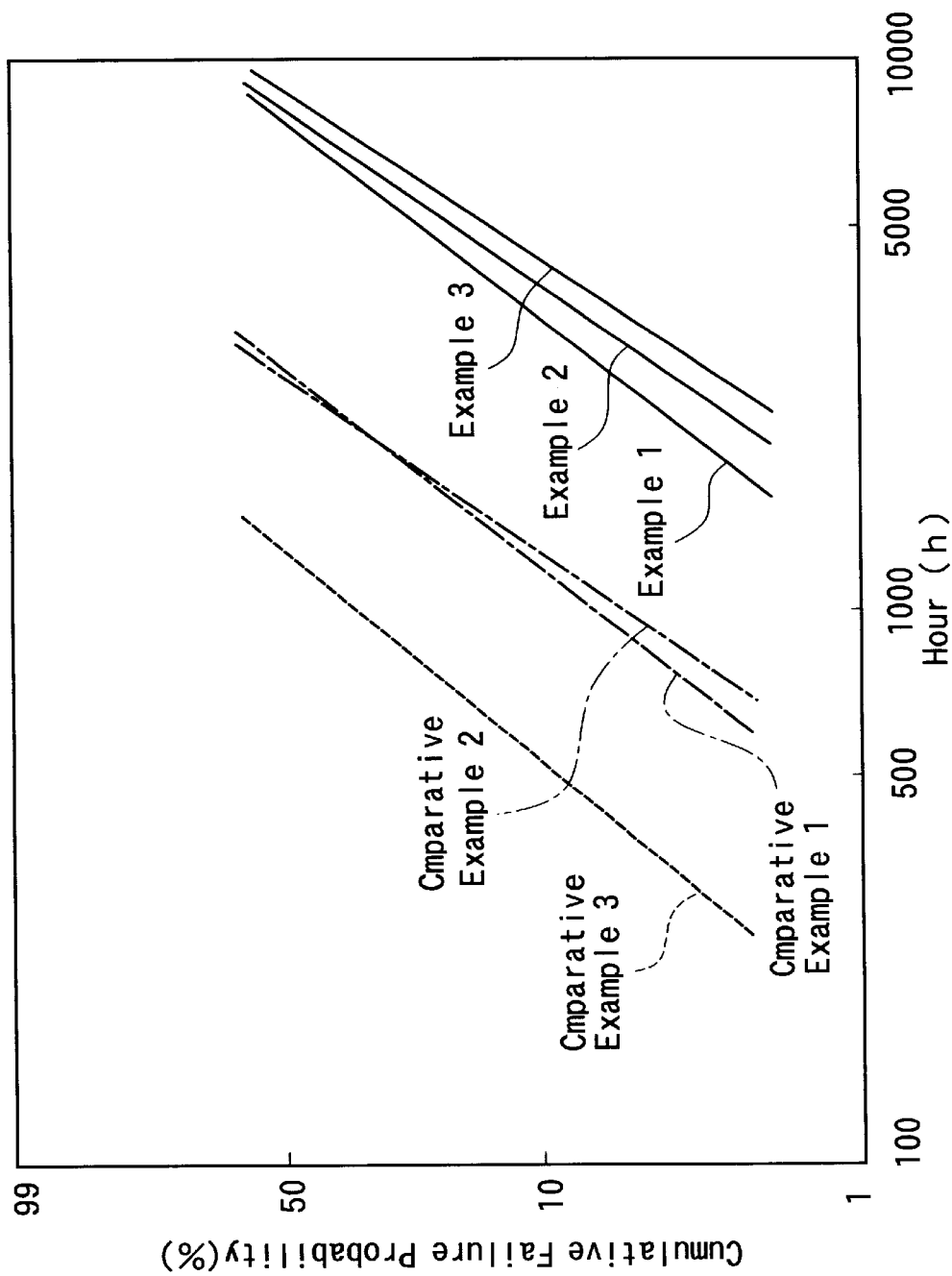
FIG. 1 is a graph representing results of the life measurement of bearing part materials of the invention.

Examples of the present invention will hereinbelow be described in detail. It is to be noted, however, that the invention is not limited to these examples.

EXAMPLE 1

In an example 1, a rotary-side race was constructed from SUJ2, which was formed with a raceway groove of R4.8 at its outer periphery and had an outside diameter of 40.7 mm, an inside diameter of 30 mm and a thickness of 16 mm; and subsequent to rough grinding of the raceway groove, the rotary-side race was subjected to a hardening/tempering treatment for adjustment of the mean particle size of carbide to 0.9 μm, the area percentage of carbide to 10%, the amount of residual austenite to 14% and the hardness to HRC=61.

EXAMPLE 2

In an example 2, a rotary-side race of the same configuration as in the example 1 was constructed from SUJ2. The rotary-side race was subjected to the hardening/tempering treatment for adjustment of the mean particle size of carbide to 0.4 μm, the area percentage of carbide to 12%, the amount of residual austenite to 9% and the hardness to HRC=63.

EXAMPLE 3

In an example 3, a rotary-side race of the same configuration as in the example 1 was constructed from SUJ2. The rotary-side race was subjected to the hardening/tempering treatment for adjustment of the mean particle size of carbide to 0.7 μm, the area percentage of carbide to 15%, the amount of residual austenite to 7% and the hardness to HRC=65.

COMPARATIVE EXAMPLE 1

In a comparative example 1, a rotary-side race of the same configuration as in the example 1 was constructed from SUJ2. The rotary-side race was subjected to the hardening/ tempering treatment for adjustment of the mean particle size of carbide to 1.2 μm, the area percentage of carbide to 19%, the amount of residual austenite to 9% and the hardness to HRC=64.

COMPARATIVE EXAMPLE 2

In a comparative example 2, a rotary-side race of the same configuration as in the example 1 was constructed from SUJ2. The rotary-side race was subjected to the hardening/ tempering treatment for adjustment of the mean particle size of carbide to 0.8 μm, the area percentage of carbide to 13%, the amount of residual austenite to 17% and the hardness to HRC=67.

In each of the above examples 1–3 and comparative examples 1–2, the shot peening treatment was conducted. After the shot peening treatment, an examination on the depth of compressive residual stress and a life test were carried out. The shot peening treatment was conducted under conditions listed in Table 1 using a device of a direct air pressure type. The life test was conducted as follows: performing precision grinding after the shot peening treatment thereby removing a 15 μm-deep portion of the surface layer of each race; subsequently performing a rolling contact fatigue test; determining a cumulative failure probability of each race; and comparing lives of the races.

TABLE 1

| Item | Condition |
| --- | --- |
| Number of rotation of grinding product | 12 rpm |
| Shot time | 90 s |

TABLE 1-continued

| Item | Condition |
| --- | --- |
| Shot ball | ϕ0.25mm, 800 Hv |
| Arc height | 0.26 mmA |

The depths of the compressive residual stress after the shot peening treatment were 150 μm to 160 μm for the examples 1–3 and 70 μm to 90 μm for the comparative examples 1–2. Thus was confirmed that the examples 1–3 have achieved greater depths of compressive residual stress.

FIG. 1 graphically represents the results of life measurement determined by the rolling contact fatigue test conducted after the shot peening treatment. In the figure, also shown is a life measurement of a comparative example 3 wherein the shot peening treatment was dispensed with.

As apparent from FIG. 1, the life of the examples 1–3 within the scope of the invention is, at the maximum, twice as long as the life of the comparative examples 1–2 and has smaller variations. Further, the examples 1–3 present the life more than 6 times as long as the comparative example 3 does.

The tests done by the present inventors indicated that in order to increase the life of the comparative examples 1–2, the shot peening treatment must be done with the shot time of Table 1 extended to more than 135 seconds or more than 1.5 times that for the examples 1–3.

It was confirmed from the above results that in the material for bearing parts, the life requirements for bearings can be satisfied without an excessive increase in the shot time during the shot peening treatment if the material is adjusted for the mean particle size of carbide contained in its tempered martensitic structure to less than 1 μm, the area percentage of carbide to 10–15%, the amount of residual austenite to 7–14% and the hardness thereof to HRC=61–65.

What is claimed is:

1. A material for bearing parts comprising a steel hardened by a heat treatment and having a tempered martensitic structure at its surface layer to be subjected to a shot peening treatment, wherein said steel is SUJ2 bearing steel, and said tempered martensitic structure contains carbide with a mean particle size of less than 1 μm and an area percentage of 10–15%, and residual austenite in an amount of 7–14%, and has a hardness of HRC=61–65.

2. A bearing part which is a race constructed from the material for bearing parts according to claim 1.

3. A bearing part made from a material for bearing parts comprising a bearing steel hardened by a heat treatment and having a tempered martensitic structure at its surface layer and having been subjected to a shot peening treatment, said tempered martensitic structure containing carbide with a mean particle size of less that 1 μm and an area percentage of 10–15%, and residual austenite in an amount of 7–14%, and a hardness of HRC=61–65, wherein said steel is SUJ2 steel.

* * * * *